United States Patent
Ochi et al.

(10) Patent No.: US 9,946,104 B2
(45) Date of Patent: Apr. 17, 2018

(54) DISPLAY DEVICE AND METHOD OF MANUFACTURING THE SAME

(71) Applicant: Japan Display Inc., Tokyo (JP)

(72) Inventors: Tetsuro Ochi, Tokyo (JP); Hiroyuki Sakakura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/387,076

(22) Filed: Dec. 21, 2016

(65) Prior Publication Data

US 2017/0184912 A1   Jun. 29, 2017

(30) Foreign Application Priority Data

Dec. 28, 2015 (JP) .................................. 2015-256509
Jun. 7, 2016 (JP) .................................. 2016-113844

(51) Int. Cl.
 *F21V 8/00* (2006.01)
 *G02F 1/1333* (2006.01)

(52) U.S. Cl.
 CPC .................. *G02F 1/133308* (2013.01); *G02F 2001/133314* (2013.01); *G02F 2001/133317* (2013.01); *G02F 2001/133325* (2013.01); *G02F 2001/133331* (2013.01); *G02F 2202/28* (2013.01)

(58) Field of Classification Search
 CPC ................................................ G02F 1/133308
 See application file for complete search history.

(56) References Cited

U.S. PATENT DOCUMENTS

| | | |
|---|---|---|
| 2009/0186552 A1 | 7/2009 | Shinya et al. |
| 2009/0296033 A1 | 12/2009 | Shinya et al. |
| 2010/0003425 A1 | 1/2010 | Kamata et al. |
| 2010/0033661 A1 | 2/2010 | Shinya et al. |
| 2010/0043965 A1 | 2/2010 | Kamiya et al. |
| 2010/0097552 A1 | 4/2010 | Shinya et al. |
| 2010/0097746 A1 | 4/2010 | Toyoda et al. |
| 2010/0098839 A1 | 4/2010 | Toyoda et al. |
| 2010/0118245 A1 | 5/2010 | Toyoda et al. |
| 2010/0134713 A1 | 6/2010 | Toyoda et al. |
| 2010/0178834 A1 | 7/2010 | Toyoda et al. |
| 2010/0210166 A1 | 8/2010 | Toyoda et al. |
| 2011/0285934 A1 | 11/2011 | Watanabe |
| 2012/0118483 A1 | 5/2012 | Toyoda et al. |
| 2013/0027857 A1* | 1/2013 | Jeong ................ G02F 1/133308 361/679.01 |

(Continued)

FOREIGN PATENT DOCUMENTS

| | | |
|---|---|---|
| JP | 2010-026216 | 2/2010 |
| JP | 4711354 B2 | 6/2011 |

(Continued)

*Primary Examiner* — Thomas M Sember
(74) *Attorney, Agent, or Firm* — K&L Gates LLP

(57) ABSTRACT

According to one embodiment, a display device includes a cover panel, a display panel opposed to the cover panel, an adhesive layer provided between the cover panel and the display panel and attaching the display panel to the cover panel, the adhesive layer including a first area to which the display panel is fixed and a second area located further outward than an outer periphery of the display panel, a backlight unit opposed to the display panel, and a case containing the display panel and the backlight unit, at least a part of the case being fixed to the cover panel by the second area of the adhesive layer.

13 Claims, 12 Drawing Sheets

(56) References Cited

U.S. PATENT DOCUMENTS

| | | |
|---|---|---|
| 2014/0256207 A1 | 9/2014 | Toyoda et al. |
| 2014/0287153 A1 | 9/2014 | Toyoda et al. |
| 2014/0329431 A1 | 11/2014 | Shinya et al. |
| 2015/0253598 A1 | 9/2015 | Shinya et al. |
| 2016/0011454 A1 | 1/2016 | Toyoda et al. |
| 2016/0116789 A1 | 4/2016 | Toyoda et al. |

FOREIGN PATENT DOCUMENTS

| | | |
|---|---|---|
| JP | 5122657 B2 | 1/2013 |
| JP | 5343388 B2 | 11/2013 |
| JP | 5477147 B2 | 4/2014 |
| JP | 5477417 B2 | 4/2014 |
| WO | 2008/126856 A1 | 10/2008 |
| WO | 2008/126860 A1 | 10/2008 |
| WO | 2008/126868 A1 | 10/2008 |
| WO | 2008/126893 A1 | 10/2008 |
| WO | 2009/011353 A1 | 1/2009 |

\* cited by examiner

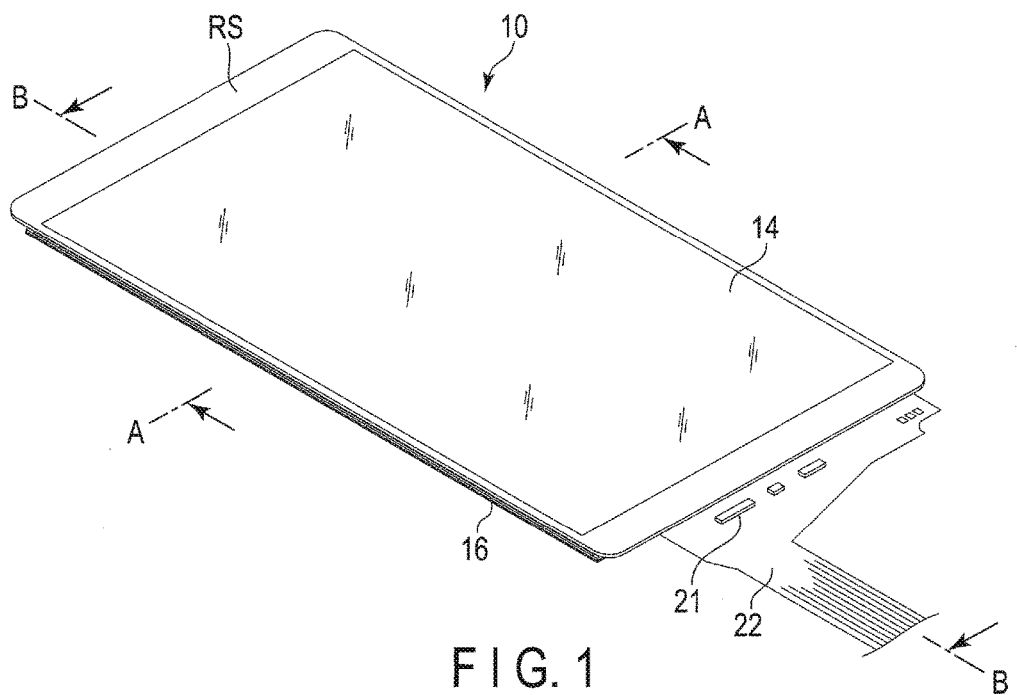
F I G. 1
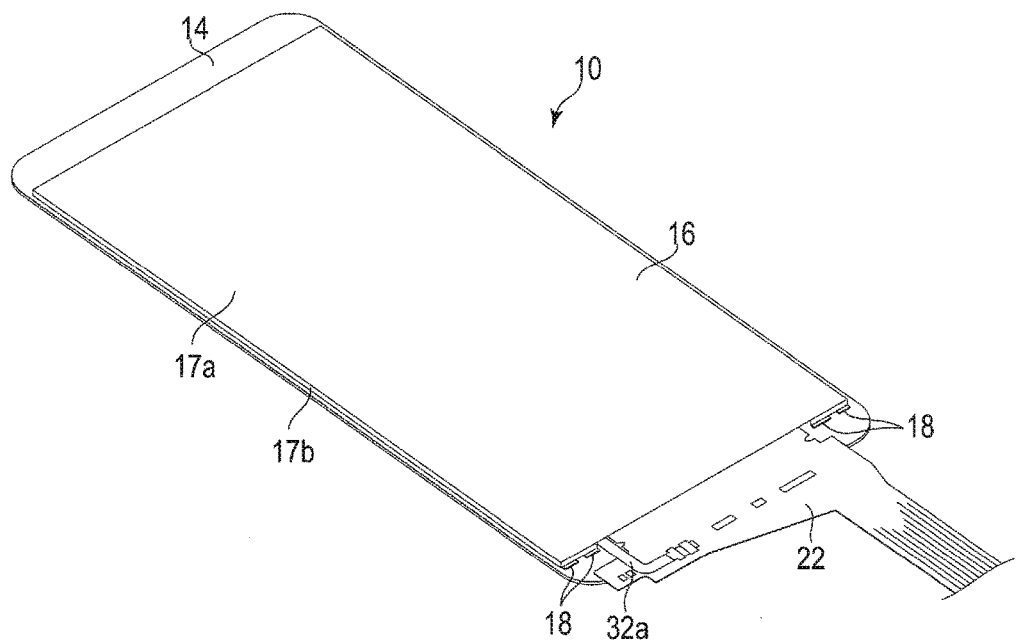
F I G. 2

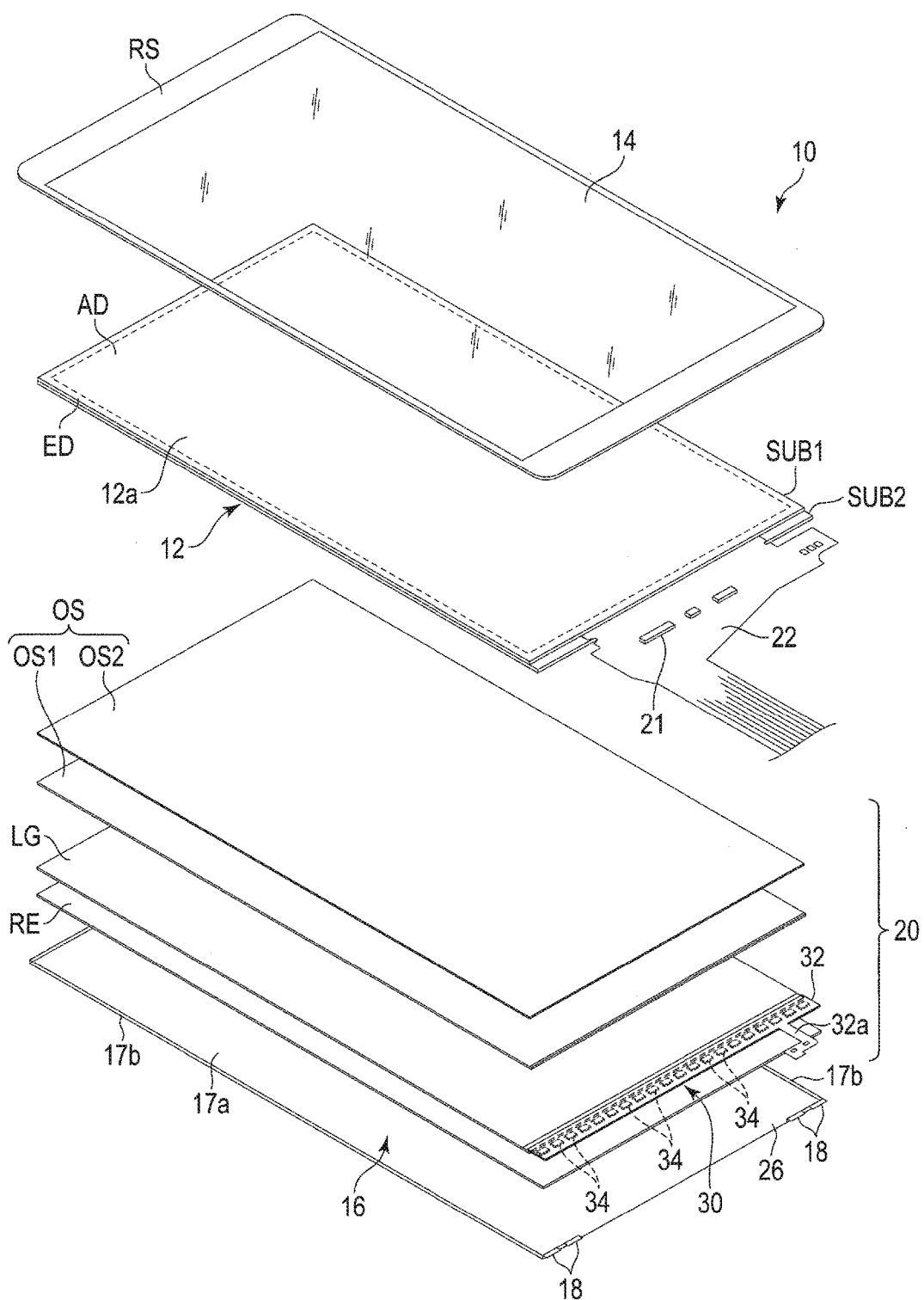
F I G. 3

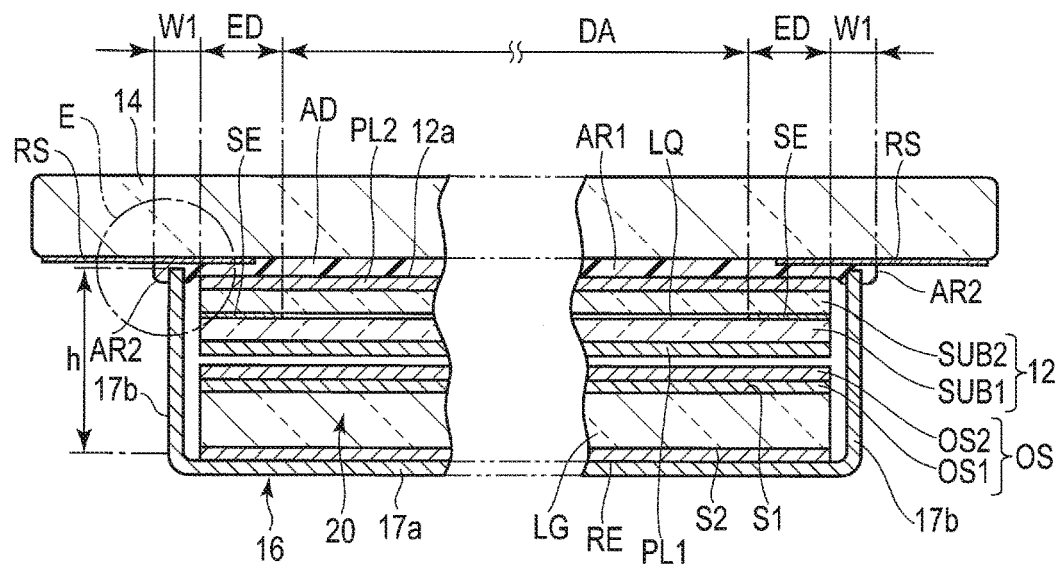
F I G. 5A
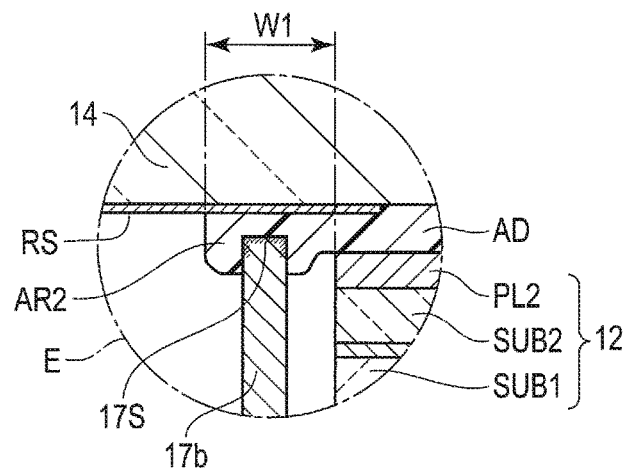
F I G. 5B

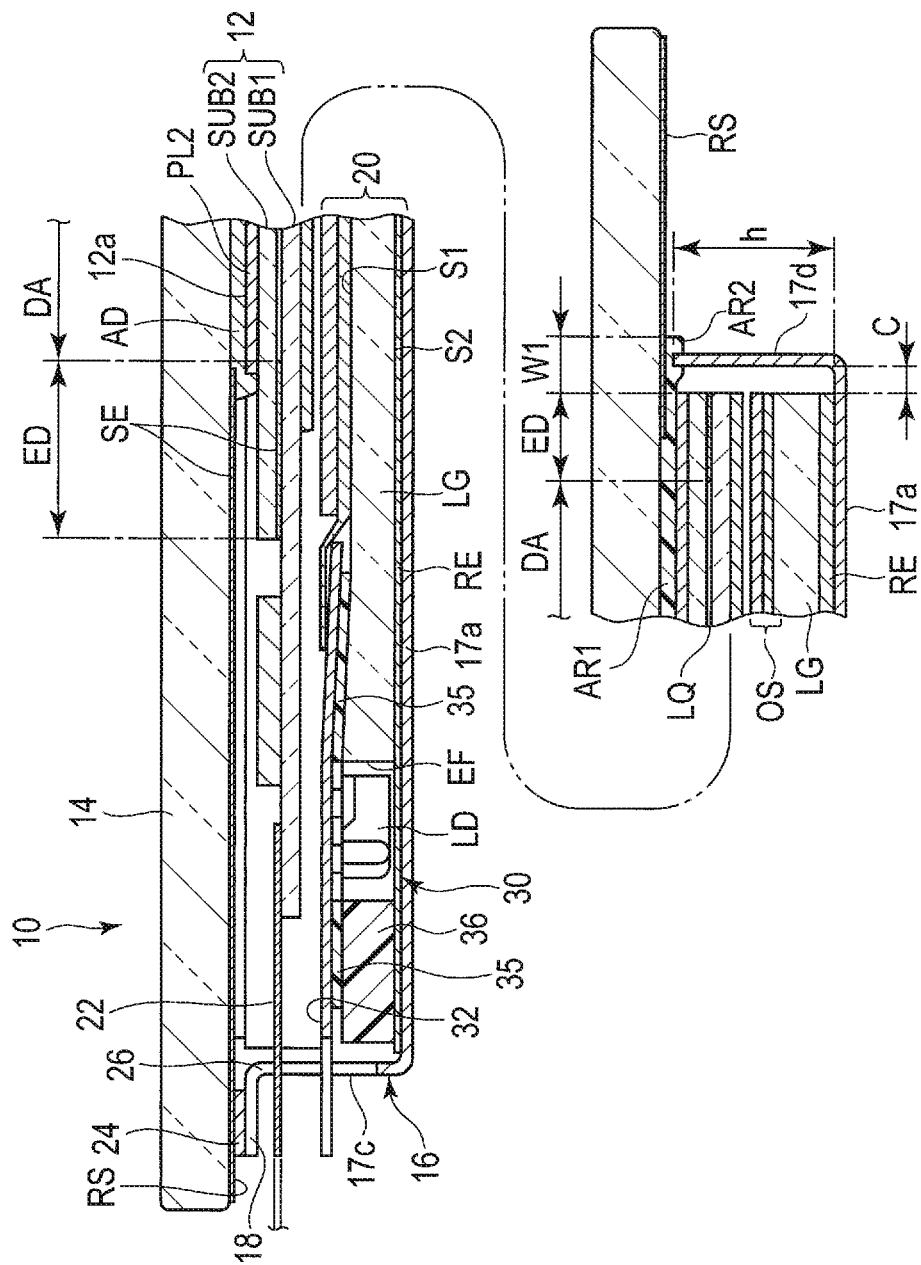
F I G. 6

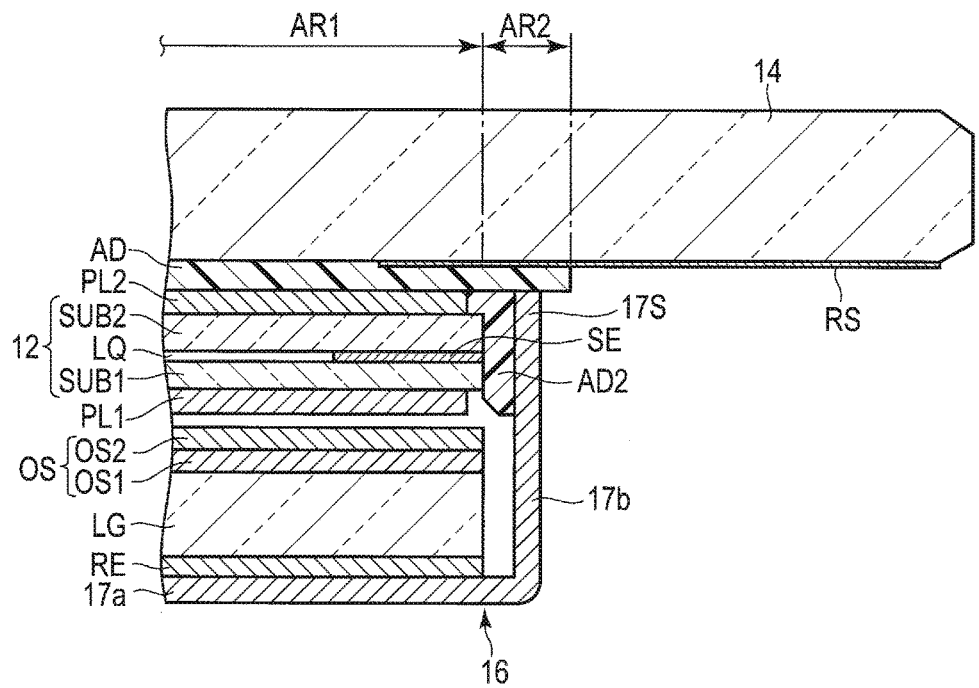
F I G. 16
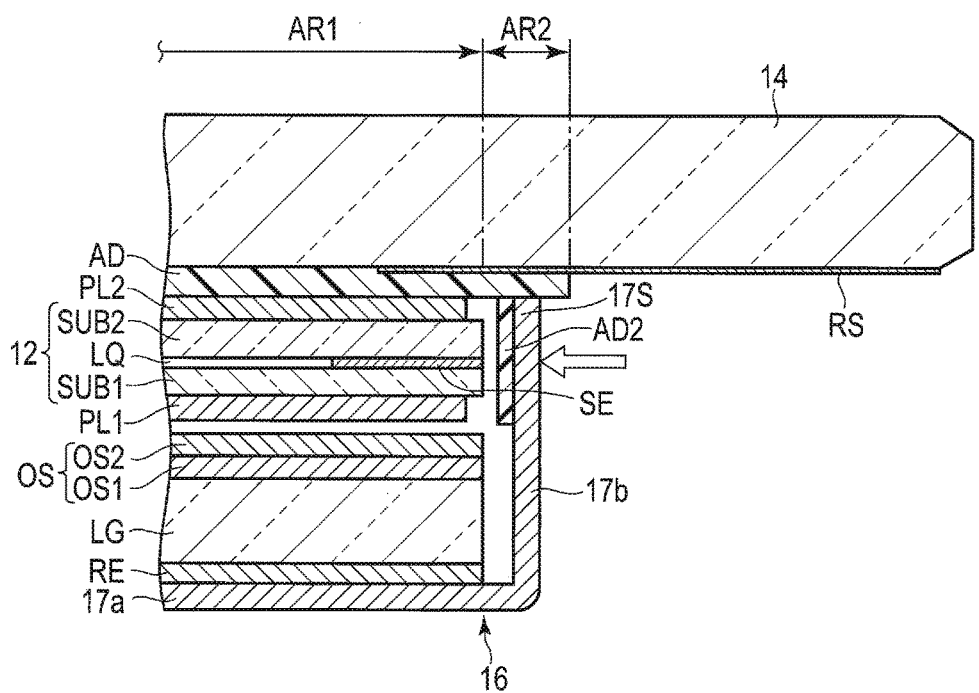
F I G. 17

DISPLAY DEVICE AND METHOD OF MANUFACTURING THE SAME

CROSS-REFERENCE TO RELATED APPLICATIONS

This application is based upon and claims the benefit of priority from Japanese Patent Applications No. 2015-256509, filed Dec. 28, 2015; and No. 2016-113844, filed Jun. 7, 2016, the entire contents of all of which are incorporated herein by reference.

FIELD

Embodiments described herein relate generally to a display device and a method of manufacturing the same.

BACKGROUND

In recent years, liquid crystal display devices have come to be widely used in smartphones, personal digital assistants (PDAs), tablet computers, satellite navigation systems, etc. In general, a liquid crystal display device comprises a liquid crystal display panel and a surface illumination device (backlight device) which is overlaid on the rear surface of the liquid crystal display panel and illuminates the liquid crystal display panel. The backlight device comprises a reflective layer, a lightguide plate (lightguide), an optical sheet, a light source such as LEDs, and a rectangular mold frame. The reflective layer, the lightguide plate, and the optical sheet are stacked on each other, and fitted into the mold frame. The peripheries of the reflective layer, the lightguide plate, and the optical sheet are thereby supported and positioned by the mold frame.

As this type of backlight device, the structure in which a mold frame is fitted into a case (backlight cover) made of a metal plate, and further, a reflective layer, a lightguide plate, and an optical sheet are disposed in a cavity of the mold frame has been proposed.

In recent years, as display areas have increased, there has been a continual demand for the frames of liquid crystal display devices to become ever narrower and the liquid crystal display devices to become ever thinner. However, the above-described backlight device including the mold frame is approaching the structural limit of the mold frame, and it is hard to meet the demand for further reduction in thickness and further narrowing of the frame.

SUMMARY

The present application relates generally to a display device and a method of manufacturing the same.

In an embodiment, a display device is provided. The display device includes a cover panel; a display panel opposed to the cover panel; an adhesive layer provided between the cover panel and the display panel and attaching the display panel to the cover panel, the adhesive layer comprising a first area to which the display panel is fixed and a second area located further outward than the display panel; a backlight unit opposed to the display panel; and a case containing the display panel and the backlight unit, at least a part of the case being fixed to the cover panel by the second area of the adhesive layer.

In another embodiment, a method of manufacturing a display device is provided. The method includes forming an adhesive layer comprising a first area and a second area on a cover panel; irradiating the adhesive layer with an ultraviolet ray and provisionally curing the adhesive layer; attaching a display panel to the first area of the provisionally cured adhesive layer; opposing a backlight unit to the display panel; covering the backlight unit with a case, and attaching at least a part of the case to the second area of the provisionally cured adhesive layer; and irradiating the adhesive layer with an ultraviolet ray through the cover panel and thoroughly curing the adhesive layer.

Additional features and advantages are described herein, and will be apparent from the following Detailed Description and the figures.

BRIEF DESCRIPTION OF THE DRAWINGS

FIG. 1 is a perspective view showing a display surface side of a liquid crystal display device according to a first embodiment.

FIG. 2 is a perspective view showing a rear surface side of the liquid crystal display device.

FIG. 3 is an exploded perspective view of the liquid crystal display device.

FIG. 5A is a sectional view of the liquid crystal display device taken along line A-A of FIG. 1.

FIG. 5B is an enlarged sectional view showing an area E of FIG. 5A.

FIG. 6 is a sectional view of the liquid crystal display device taken along line B-B of FIG. 1.

FIG. 16 is a sectional view showing a part of a liquid crystal display device according to a second embodiment.

FIG. 17 is a sectional view showing the state of a part of the liquid crystal display device before a second adhesive layer foams in the second embodiment.

DETAILED DESCRIPTION

Figure 4:
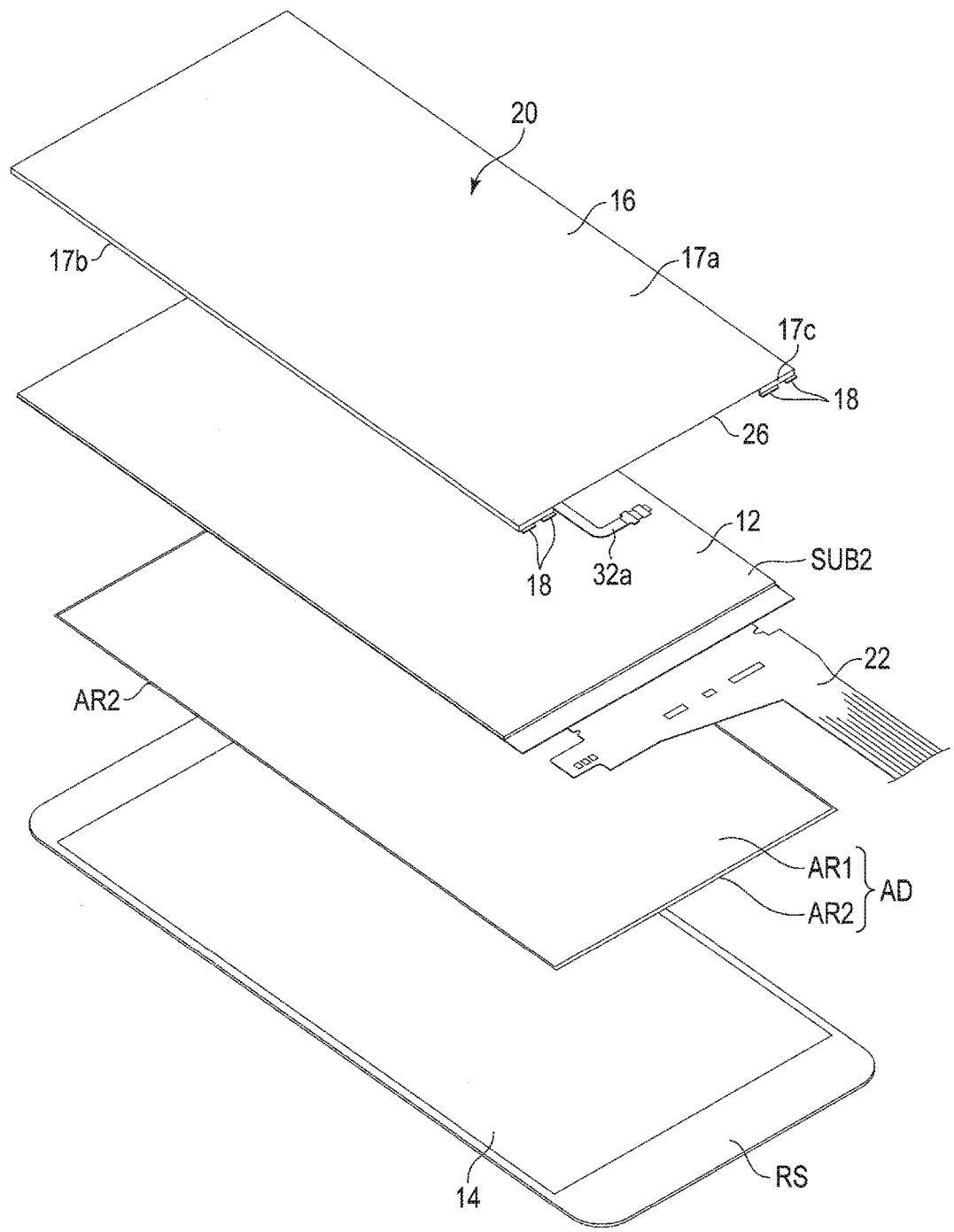
FIG. 4 is an exploded perspective view showing the rear surface side of the liquid crystal display device.

Various embodiments will be described hereinafter with reference to the accompanying drawings. In general, according to one embodiment, a display device comprises a cover panel; a display panel opposed to the cover panel; an adhesive layer provided between the cover panel and the display panel and attaching the display panel to the cover panel, the adhesive layer comprising a first area to which the display panel is fixed and a second area located further outward than an outer periphery of the display panel; a backlight unit opposed to the display panel; and a case containing the display panel and the backlight unit, at least a part of the case being fixed to the cover panel by the second area of the adhesive layer.

The disclosure is merely an example, and proper changes within the spirit of the invention, which are easily conceivable by a person with ordinary skill in the art, are included in the scope of the invention as a matter of course. In addition, in some cases, in order to make the description clearer, the widths, the thicknesses, the shapes, etc., of the respective parts are schematically illustrated in the drawings, compared to the actual modes. However, the schematic illustration is merely an example, and adds no restrictions on the interpretation of the present invention. Further, in the specification and drawings, the same elements as those described in connection with preceding drawings are given the same reference numbers, and a detailed description thereof is omitted as appropriate.

(First Embodiment)

FIG. 1 and FIG. 2 are perspective views showing a display surface side and a rear surface side of a liquid crystal display device according to a first embodiment, respectively. FIG. 3 and FIG. 4 are exploded perspective views showing the display surface side and the rear surface side of the liquid crystal display device.

A liquid crystal display device (LCD) 10 can be incorporated into various electronic apparatuses, for example, a smartphone, a tablet computer, a feature phone, a notebook computer, a portable game console, an electronic dictionary, a television set, and a satellite navigation system.

As shown in FIGS. 1 to 4, the LCD 10 comprises an active-matrix plate-shaped liquid crystal display panel (herein after referred to display panel) 12, a transparent cover panel 14 overlaid on a display surface 12a, which is one flat surface of the display panel 12, and covering the whole display surface 12a, and a backlight unit 20 as an illumination device (backlight device) opposed to the rear surface, which is the other flat surface of the display panel 12. In addition, the display panel 12 and the backlight unit 20 are accommodated in a case 16 fixed to the cover panel 14.

FIG. 5A is a transverse sectional view of the liquid crystal display device taken along line A-A of FIG. 1. FIG. 5B is an enlarged sectional view showing a portion E of FIG. 5A. FIG. 6 is a longitudinal sectional view of the liquid crystal display device taken along line B-B of FIG. 1. As shown in FIG. 3 to FIG. 6, the display panel 12 comprises a first substrate SUB1 in the shape of a rectangular plate, a second substrate SUB2 in the shape of a rectangular plate opposed to the first substrate SUB1, and a liquid crystal layer LQ held between the first substrate SUB1 and the second substrate SUB2. The periphery of the second substrate SUB2 is affixed to the first substrate SUB1 with a sealing member SE. A polarizer PL2 is attached to the surface of the second substrate SUB2 to form the display surface 12a of the display panel 12. A polarizer PL1 is attached to the surface of the first substrate SUB1 (the rear surface of the display panel 12).

The display panel 12 is provided with a rectangular display area (active area) DA which is located inside of the sealing member SE in a planar view of the display panel 12, and an image is displayed in the display area DA. In addition, a rectangular frame area (non-display area) ED is provided around the display area DA. The display panel 12 is of a transmissive type which has a transmissive display function of displaying an image by selectively transmitting light from the backlight unit 20 to the display area DA. As a display mode, the display panel 12 may primarily include a structure corresponding to a lateral electric field mode in which a lateral electric field along a main surface of a substrate is used, or may primarily include a structure corresponding to a vertical electric field mode in which a vertical electric field crossing the main surface of the substrate is used.

In the shown example, a flexible printed circuit board (FPC) 22 is joined to an end portion on a short side of the first substrate SUB1, and extends outward from the display panel 12. On the FPC 22, a semiconductor element such as a driving IC chip 21 is mounted as a signal supply source which supplies signals necessary to drive the display panel 12.

As shown in FIG. 1 to FIG. 5B, the cover panel 14 is, for example, formed of a glass plate or acrylic transparent resin and in the shape of a rectangular plate. The cover panel 14 has greater dimensions (width and length) than those of the display panel 12, and has a larger area than that of the display panel 12 in a planar view (hereinafter, which means a state in which the liquid crystal display panel is viewed in the normal direction of the display surface). The rear surface (back surface) of the cover panel 14 is attached to the display surface 12a of the display panel 12 with, for example, an adhesive layer AD formed of transparent adhesive or transparent pressure-sensitive adhesive, and covers the whole display surface 12a. The peripheral portion of the cover panel 14 projects further outward than the outer periphery of the display panel 12. Each of the long sides of the cover panel 14 is substantially parallel to the associated long side of the display panel 12, and is a predetermined distance from the associated long side. Each of the short sides of the cover panel 14 is substantially parallel to the associated short side of the display panel 12, and is a predetermined distance from the associated short side. In the present embodiment, the distance between the long side of the cover panel 14 and the long side of the display panel 12 adjacent to, that is, the width of the periphery at the long sides of the cover panel 14, is less than the distance between the short side of the cover panel 14 and the short side of the display panel 12 adjacent to, that is, the width of the periphery at the short sides of the cover panel. The periphery on the long sides may be formed in the same width with the periphery on the short sides.

A light-shielding layer RS in the shape of a frame is formed on the lower surface (the back surface, or the surface on the liquid crystal display panel side) of the cover panel 14. On the cover panel 14, an area other than that opposed to the display area DA of the display panel 12 is shielded from light by the light-shielding layer RS. The light-shielding layer RS may be formed on the upper surface (outer surface) of the cover panel 14.

The above-described adhesive layer AD is formed into a rectangle having dimensions (width and length) that are slightly greater than those of the display surface 12a of the display panel 12 but slightly less than those of the cover panel 14. The periphery of the adhesive layer AD is located to be laid on the light-shielding layer RS. The adhesive layer AD includes a rectangular first area AR1, to which the display panel 12 is attached, and a second area AR2 in the shape of a rectangular frame, which is located on the outer periphery side of the first area AR1. The first area AR1 is substantially the same in size as the display surface 12a of the display panel 12. The display panel 12 is attached to the whole surface of the first area AR1. The second area AR2 is a portion extending further outward than each side edge of the display surface of the display panel 12 in a planar view, and extends along each side with a predetermined width. Each portion of the second area AR2 is formed to have a width W1 of, for example, 0.2 to 0.5 mm (200 to 500 μm), which is less than the distance (width) between each long side of the display panel 12 and each associated long side of the cover panel 14.

The thickness of the first area AR1 of the adhesive layer AD is substantially uniform over the whole area, and is, for example, 0.05 to 0.2 mm (50 to 200 μm). The thickness of the second area AR2 is greater than that of the first area AR1, and is, for example, 0.051 to 0.4 mm (51 to 400 μm).

The adhesive layer AD is formed of adhesive or pressure-sensitive adhesive which is greatly transparent and so viscous that it can be applied to the cover panel 14. In the present embodiment, photo-curing optical elastic resin (super view resin) (hybrid super view resin) is used as the adhesive forming the adhesive layer AD. The photo-curing super view resin is a liquid when being applied to the cover panel 14. For example, the photo-curing super view resin enters a provisionally cured state in which it is more viscous by being irradiated with ultraviolet rays, and enters a thoroughly cured state in which it hardens by being further irradiated with ultraviolet rays.

As shown in FIG. 2 to FIG. 6, the case 16 covering the backlight unit 20 is formed of a thin plate material. The case 16 is, for example, formed as a flat rectangular tray (rectangular lid) by bending or pressing a stainless plate material having a thickness of 0.1 mm As the plate thickness of the case 16 is smaller, the frame can be more narrowed, and the display device as a whole can be more thinned In the example, a stainless plate material having a thickness of 0.1 mm is used. However, if sheet metal having a thickness of 0.05 mm is used, the frame can be thinned by 0.05 mm and the device as a whole can be thinned by 0.05 mm In the case of insert molding of a resin material, a plate material having a thickness of 0.15 mm may be used.

In a planar view, the case 16 has dimensions greater than those of the display panel 12 but less than those of the cover panel 14. The case 16 comprises a rectangular bottom wall 17a, and a pair of sidewalls 17b, 17b on the long sides and a pair of sidewalls 17c, 17d on the short sides which are provided to stand on the respective side edges of the bottom wall 17a. In the present embodiment, the sidewalls 17b on the long sides are provided to stand substantially perpendicular to the bottom wall 17a, and extend over the total length of the long sides of the bottom wall 17a. The sidewalls 17c, 17d on the short sides are provided to stand substantially perpendicular to the bottom wall 17a, and extend over the total length of the short sides of the bottom wall 17a. The height h from the bottom wall 17a of the sidewalls 17b, 17c, and 17d is slightly greater than the sum of the thickness of the display panel 12 and that of the backlight unit 20, which will be described later.

In the present embodiment, the case 16 comprises flanges 18 extending outward from a top edge of the sidewall 17c on the light source side, which will be described later. In addition, in the sidewall 17c, an opening 26 for passing an FPC, which will be described later, is formed. The flanges 18 are provided on both sides of the opening 26.

As shown in FIG. 2, FIG. 5A, and FIG. 6, the case 16 having the above-described structure is arranged to cover the backlight unit 20 and the display panel 12. The end edges of the sidewalls 17b, 17d, and 17c of the case 16 are adhered to the lower surface of the cover panel 14 with the adhesive layer AD, which is also used for the attachment of the display panel 12, and double-sided adhesive tape 24. In this manner, the case 16 is fixed to the cover panel 14.

Except for the sidewalls 17c on the short side of the case 16, the sidewall 17d and the pair of sidewalls 17b are opposed to the corresponding side edges of the display panel 12 with an extremely small gap C (for example, 0.05 to 0.15 mm) therebetween. Top edges 17S (see FIG. 5B) of these the sidewalls 17b and 17d are inserted in the second area AR2 of the adhesive layer AD, and attached and fixed to the cover panel by the adhesive layer AD. As shown in FIG. 5B, the surfaces of the top edges 17S of these sidewalls 17b and 17d are formed more roughly than the other portions of the case 16 and moderately roughened to improve the adhesion to the adhesive layer AD. The top edges 17S of the sidewalls 17b and 17d can be roughly formed by, for example, rubbing a rough file on the surfaces of the top edges 17S and roughing them or washing the top edges 17S with acid and roughing the surfaces thereof. This improves the adhesion of the top edges 17S to the adhesive layer AD, and enables an anchor effect to be obtained.

As shown in FIG. 5A and FIG. 5B, the sidewalls 17b and 17d are fixed in the second area AR2 of the adhesive layer AD in a state in which the adhesive layer AD is interposed between the top edges 17S of the sidewalls 17b and 17d and the inner surface (light-shielding layer RS) of the cover panel 14. Since the adhesive layer AD is interposed in this manner, the top edges 17S of the sidewalls 17b and 17c can be prevented from directly contacting and damaging the inner surface of the cover panel 14 or the light-shielding layer RS. In addition, because of the elasticity of the adhesive layer AD made of super view resin, it is hard to transmit a distortion of the case 16 (for example, the fall of an iron ball) to the display panel 12, and to the display panel 12 can be prevented from being damaged. Furthermore, since a soft and easily extendible material is used as the adhesive layer AD, it is hard to transmit a static distortion of the case 16 (for example, a warp due to a difference in coefficient of linear expansion) to the display panel 12, and non-uniformity in the gap of the display panel 12 can be prevented.

As shown in FIG. 6, the sidewall 17c is opposed to the short side of the display panel 12 with a gap therebetween, which is larger than the gap C between the other sidewalls 17b, 17d and the display panel 12. The flanges 18 of the sidewall 17c are attached and fixed to the cover panel 14 by the double-sided tape 24. Hotmelt adhesive, epoxy adhesive, UV curing adhesive, etc., as well as the double-sided tape 24, can be used to fix the flanges 18 and the cover panel 14 to each other.

The bottom wall 17a of the case 16 is opposed to the rear surface of the display panel 12 and substantially parallel to the rear surface of the display panel 12 with a gap therebetween. The FPC 22 extending from the display panel 12 is inserted in the opening 26 of the sidewall 17c and extends to the outside of the case 16.

It is not necessarily three sides of the case 16 that are fixed to the adhesive layer AD at the top edges 17s of the sidewalls 17b and 17c. Especially, only the top edges of the pair of sidewalls 17b on the long sides, which is required to have a narrow frame, may be fixed to the adhesive layer AD. In this case, a flange may be provided on the other of the sidewalls 17d on the short side and be more firmly fixed to the cover panel 14 by an adhesive layer, etc.

As shown in FIG. 3 to FIG. 6, the backlight unit 20 is disposed in the case 16, and opposed to the rear surface of the display panel 12. The backlight unit 20 comprises a lightguide plate LG in the shape of a rectangular plate, a rectangular reflective sheet RE, optical sheets OS stacked on the lightguide plate LG, and a light source unit 30 which emits light to the lightguide plate LG The reflective sheet RE is disposed on the bottom wall 17a of the case 16, and opposed to substantially the whole surface of the bottom wall 17a.

The lightguide plate LG comprises a first main surface S1 which is a light exit surface, a second main surface S2 on the opposite side to the first main surface S1, and an incidence surface EF connecting the first main surface S1 and the second main surface S2. In the present embodiment, the incidence surface EF is one side surface on the short side of the lightguide plate LG The lightguide plate LG is formed to have dimensions (length and width) slightly less than the inside dimensions of the case 16 but slightly greater than the display area DA of the display panel 12 in a planar view. The plate thickness of the lightguide plate LG is the greatest on one side surface (incidence surface EF) side opposed to the light source unit 30, and is the smallest on the other side surface side on the opposite side to the one side surface. The lightguide plate LG is laid on the reflective sheet RE in a state in which the second main surface S2 is opposed to the reflective sheet RE. The incidence surface EF of the lightguide plate LG is opposed to the sidewall 17c on the short side of the case 16 with a gap therebetween. The other side surfaces of the lightguide plate LG are opposed to the sidewalls 17b and 17d of the case 16, respectively, with a small gap of approximately 0.05 to 0.2 mm (50 to 200 μm) therebetween.

The optical sheets OS have light transmitting properties, and are disposed to be stacked on the first main surface S1 of the lightguide plate LG In the present embodiment, a diffusion sheet OS1 and a prism sheet OS2 formed of synthetic resin, for example, polyethylene terephthalate, are used as the optical sheets OS. The optical sheets OS are disposed to be stacked in order on the first main surface S1 of the lightguide plate LG Each of the optical sheets OS is formed to have a width equal to that of the lightguide plate LG and a length slightly less than that of the lightguide plate LG, and formed to have dimensions slightly greater than the display area DA of the display panel 12. At least three side edges of each of the optical sheets OS except a side edge on the light source side are opposed to the side walls of the case 16 with a predetermined gap (0.1 to 0.2 mm) therebetween. In addition, the optical sheets OS are opposed to the rear surface of the display panel 12 with a small gap therebetween, and are opposed to the whole display area DA of the display panel 12.

As shown in FIG. 3 and FIG. 6, the light source unit 30 comprises a printed circuit board (FPC) 32 in the shape of an elongated strip, light sources mounted on the FPC 32, for example, light-emitting diodes (LEDs) 34, and a rod shaped support frame 36 disposed on an end portion on the short side of the case 16. The LEDs 34 are arranged in the longitudinal direction of the FPC 32 (direction parallel to the short side of the case 16). In addition, the FPC 32 comprises a connection end portion 32a extending from one side edge.

One of the long-side portions of the FPC 32 is attached to the support frame 36 with an adhesive layer 35, and the other of the long-side portions is attached to an end portion on the incidence surface EF side of the lightguide plate LG with the adhesive layer 35. The LEDs 34 are thereby disposed between the sidewall 17c and the incidence surface EF of the lightguide plate LG, and each opposed to the incidence surface EF. Each of the LEDs 34, for example, preferably has a height (thickness) of 0.4 mm (400 μm) or less, and more preferably has a height (thickness) of 0.3 mm (300 μm) or less.

The connection end portion 32a of the FPC 32 extends to the outside of the case 16 through the opening 26 of the sidewall 17c of the case 16, and is electrically connected to the FPC 22. As shown in FIG. 6, one end portion on the light source side of the lowest optical sheet OS1 extends further to the light source side than that of the optical sheet OS2, and is joined to the FPC 32 with double-sided tape not shown in the figure.

According to the backlight unit 20 having the above-described structure, a drive current is passed to the LEDs 34 via the FPC 22 and the FPC 32. Light emitted from the LEDs 34 enters the lightguide plate LG from the incidence surface EF of the lightguide plate LG, and travels in the lightguide plate LG, or exits from the second main surface S2 of the lightguide plate LG, then is reflected by the reflective sheet RE, and enters the lightguide plate LG again. After passing through such a light path, light from the LEDs 34 exits from the whole first main surface (light exit surface) S1 to the display panel 12 side. The exiting light is diffused by the optical sheets OS, and then radiated to the display area DA of the display panel 12.

According to the LCD 10 having the above-described structure, the display panel 12 and the case 16 are fixed to the cover panel 14 by the common adhesive layer AD. Accordingly, as compared to the case where adhesive layers are separately provided, the number of components is reduced, and a reduction in the manufacturing cost and the simplification of manufacturing steps can be attempted. If an adhesive layer for fixing a liquid crystal display panel and an adhesive layer for fixing a case are separately and independently provided, a tolerance, that is, a gap, is produced between them, and the width of a frame increases accordingly. In contrast, in the present embodiment, since the adhesive layer for fixing the liquid crystal panel and the adhesive layer for fixing the case are formed as a single adhesive layer, the above-described tolerance is not produced, and the second area AR2 for fixing the case can be disposed close to the first area AR1. Accordingly, the width of the second area AR2 is reduced, and the narrowing of the frame of the display device can be attempted.

Next, an example of a method of manufacturing the LCD 10 having the above-described structure will be described.

Figure 7A:
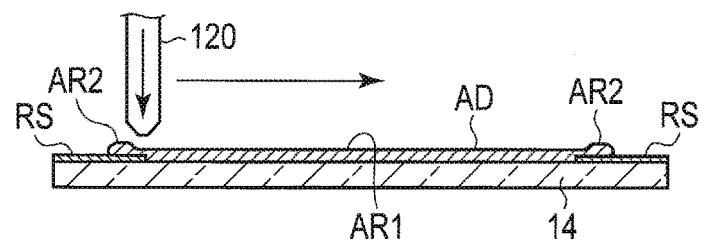
FIG. 7A, FIG. 7B, FIG. 7C, FIG. 7D, and FIG. 7E are diagrams schematically showing manufacturing steps of the liquid crystal display device, respectively.
Figure 8:
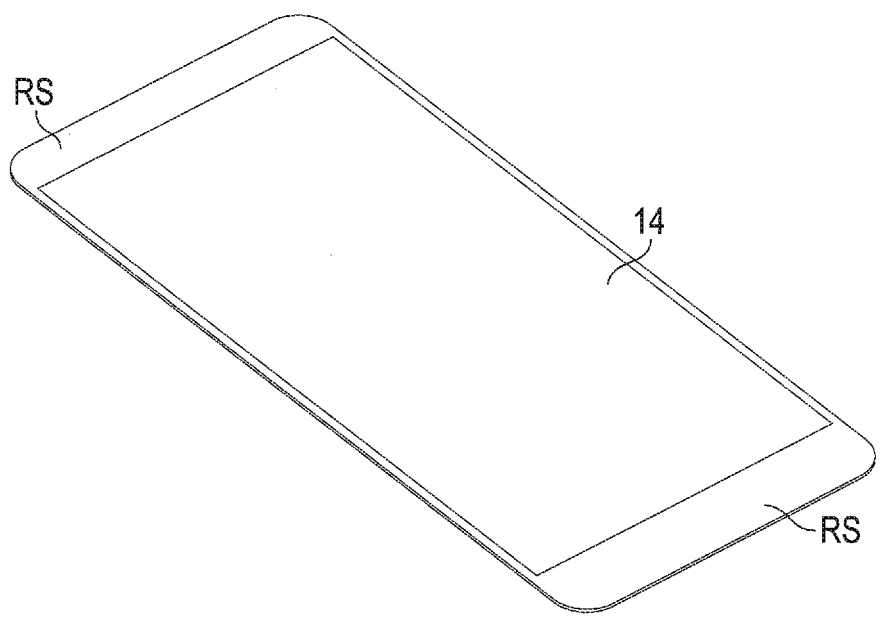
FIG. 8 is a perspective view showing a cover panel used in the manufacturing steps.
Figure 9:
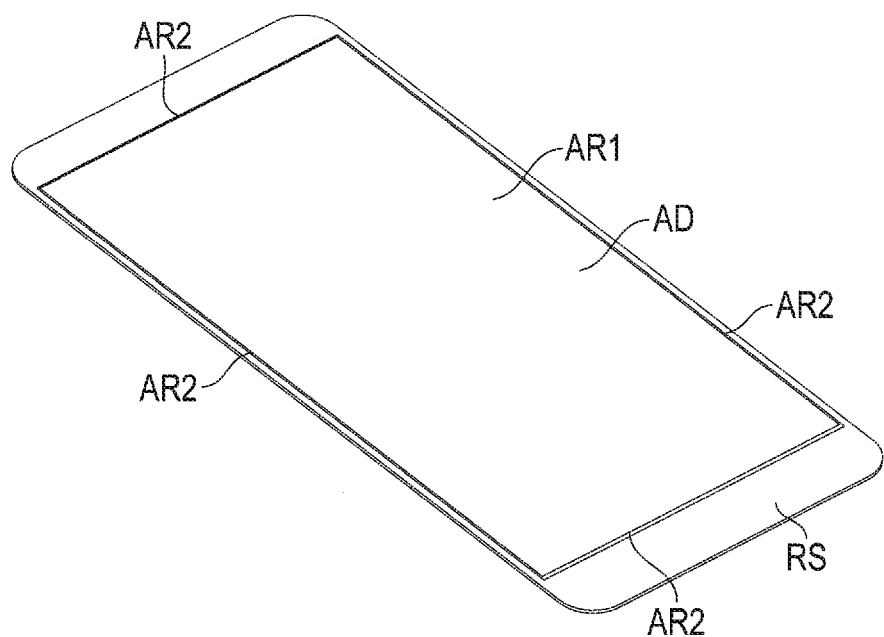
FIG. 9 is a perspective view showing the cover panel, on which an adhesive layer is formed, in the manufacturing steps.
Figure 10:
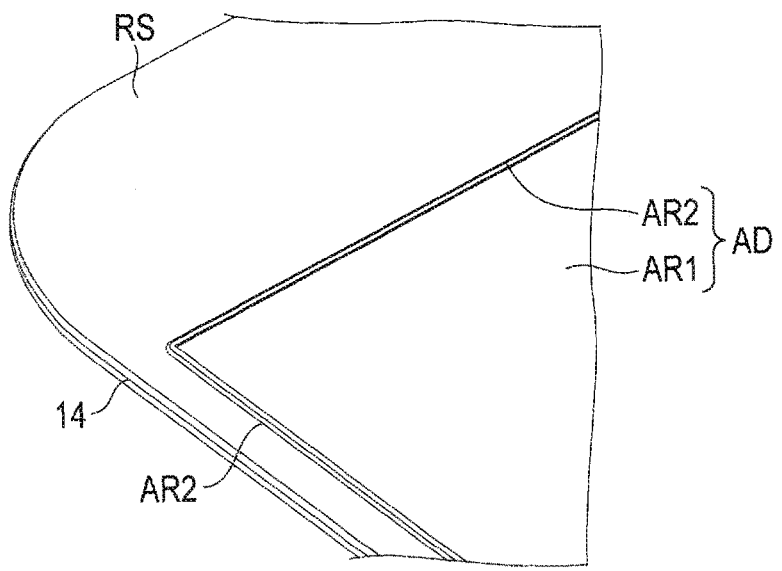
FIG. 10 is an enlarged perspective view showing a part of the cover panel.
Figure 11:
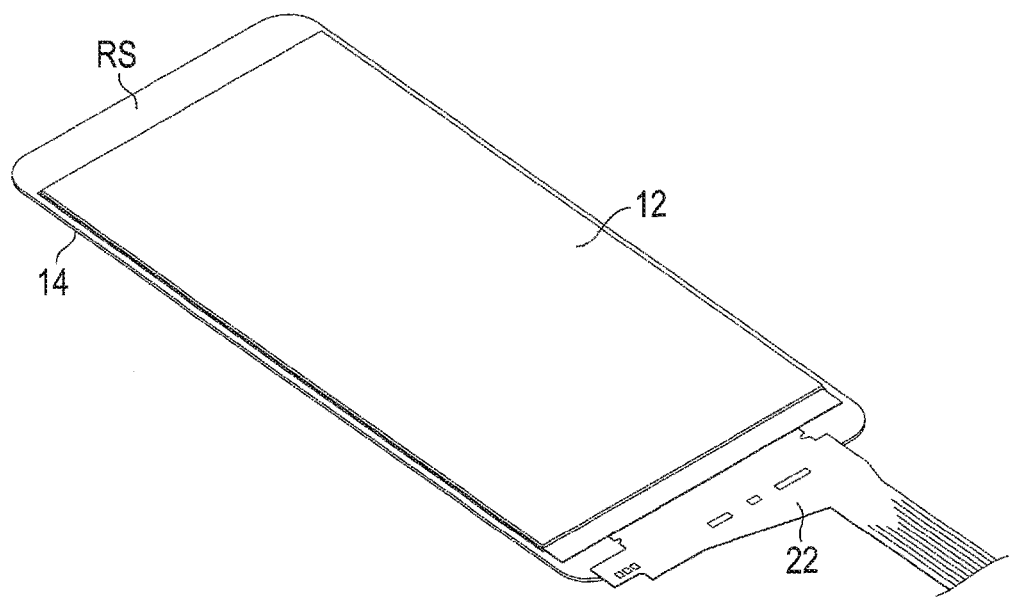
FIG. 11 is a perspective view showing the liquid crystal display device with a liquid crystal display panel attached to the cover panel in the manufacturing steps.
Figure 12:
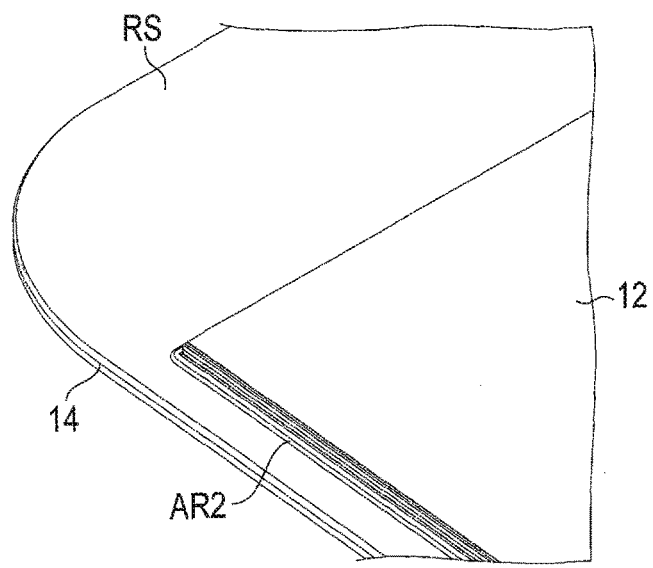
FIG. 12 is an enlarged perspective view showing a part of the liquid crystal display device.
Figure 13:
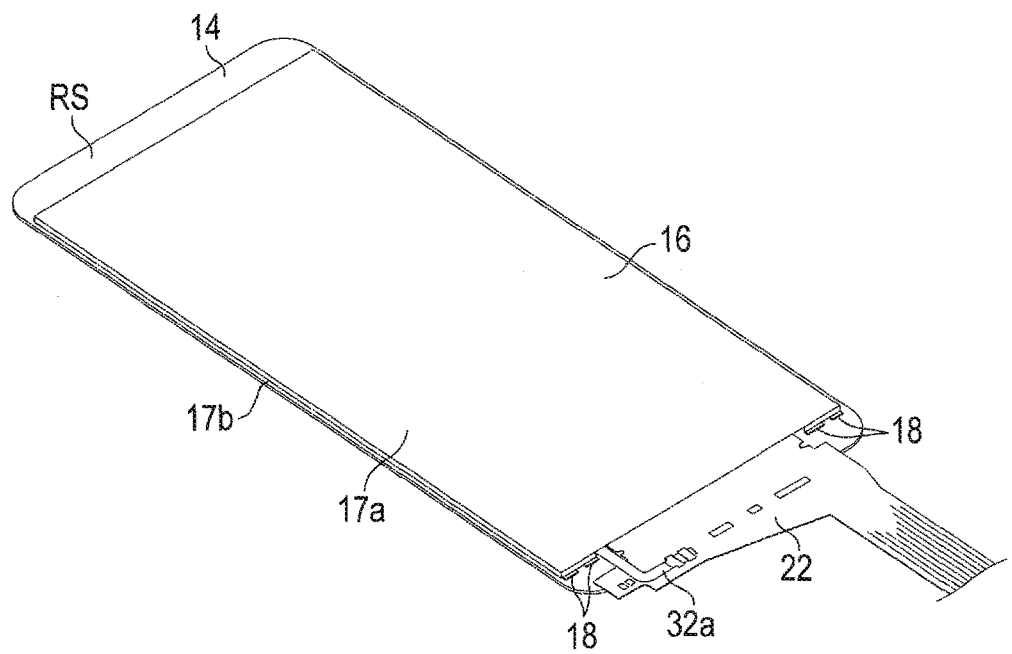
FIG. 13 is a perspective view showing the liquid crystal display device with a case attached thereto in the manufacturing steps.
Figure 14:
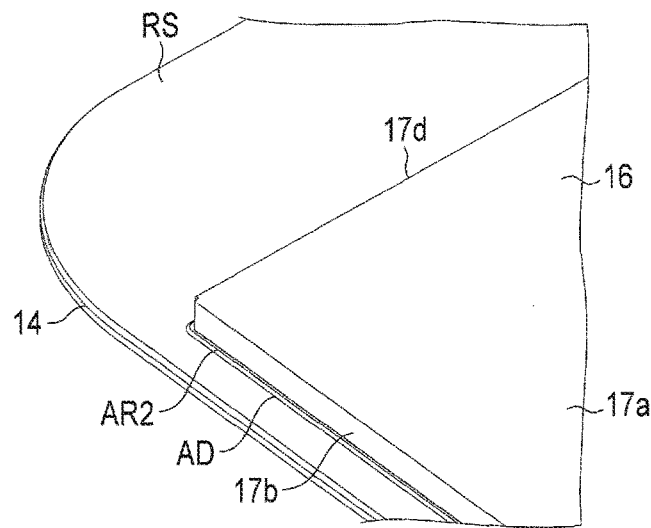
FIG. 14 is an enlarged perspective view showing a part of the liquid crystal display device.

FIG. 7A to FIG. 7E are diagrams schematically showing manufacturing steps of a liquid crystal display device, respectively. FIG. 8 is a perspective view showing a cover panel used in the manufacturing steps. FIG. 9 is a perspective view showing the cover panel on which an adhesive layer is formed in the manufacturing steps. FIG. 10 is an enlarged perspective view showing a part of the cover panel. FIG. 11 is a perspective view showing the liquid crystal display device with a liquid crystal display panel attached to the cover panel in the manufacturing steps. FIG. 12 is an enlarged perspective view showing a part of the liquid crystal display device. FIG. 13 is a perspective view showing of the liquid crystal display device with a case attached thereto in the manufacturing steps. FIG. 14 is an enlarged perspective view showing a part of the liquid crystal display device.

As shown in FIG. 8, first, the cover panel 14, on which the light-shielding layer RS is formed, is prepared. Then, as shown in FIG. 7A, FIG. 9, and FIG. 10, ultraviolet curing optical super view resin (hybrid SVR: trade name) as adhesive is applied to the front surface of the cover panel 14 to be laid on the light-shielding layer RS, and the adhesive layer AD is formed. At this time, the super view resin is applied to a predetermined area of the cover panel 14 by making a nozzle 120 traverse from one end side to the other end side in the longitudinal direction of the cover panel 14 while emitting liquid super view resin from the nozzle 120 to the cover panel 14. The adhesive layer AD having a substantially rectangular shape is thereby formed on the cover panel 14. Then, each side edge portion (periphery) of the adhesive layer AD slightly swells up because of the surface tension of the liquid super view resin, and the second area AR2 in the shape of a rectangular frame is thereby formed. Inside of the second area AR2, the flat first area AR1, which is thinner than the second area AR2, is formed to be connected to the second area AR2.

Figure 7B:
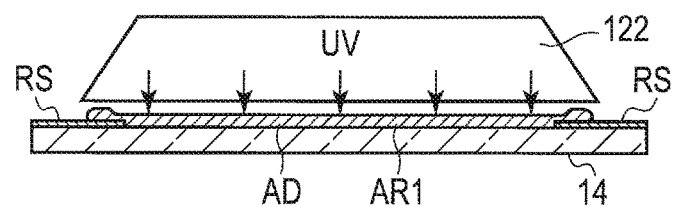

Next, as shown in FIG. 7B, the whole surface of the adhesive layer AD is directly irradiated with ultraviolet rays by an irradiator 122 for the first time with the back surface side of the cover panel 14 treated as an irradiation surface to increase the viscosity of the adhesive layer AD, and the adhesive layer AD is provisionally cured.

Figure 7C:
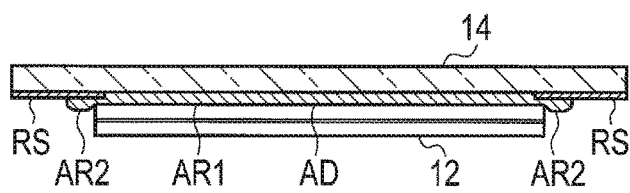

Then, as shown in FIG. 7C, FIG. 11, and FIG. 12, the display panel 12 is attached to the first area AR1 of the adhesive layer AD and fixed to the cover panel 14 by, for example, vacuum lamination. Since the display panel 12 is attached, the second area AR2 of the adhesive layer AD is located adjacently outside of each side edge of the display panel 12.

Figure 7D:
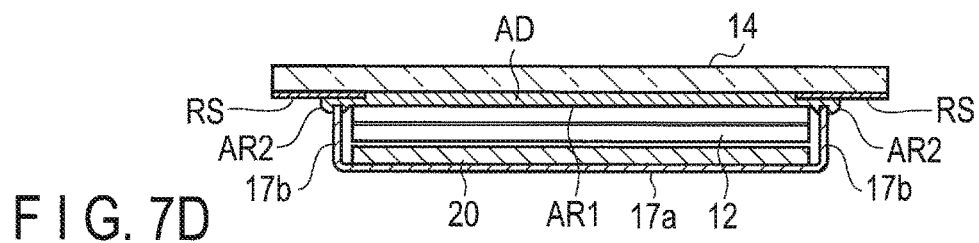

Next, as shown in FIG. 7D, FIG. 13, and FIG. 14, after the backlight unit 20 is placed in the case 16, the case 16 and the backlight unit 20 are disposed on the rear side surface side of the display panel 12. Further, the top edges of the sidewalls 17b and 17d of the case 16 are inserted in the second area AR2 of the adhesive layer AD, and fixed to the cover panel 14 by the adhesive layer AD. In addition, the flanges 18 of the case 16 are attached to the cover panel 14 with double-sided tape not shown in the figures.

Figure 7E:
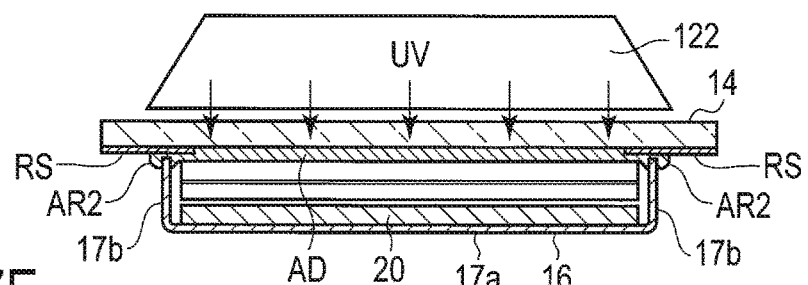

Then, as shown in FIG. 7E, the adhesive layer AD is irradiated with ultraviolet rays by the irradiator 122 for the second time through the cover panel 14 from the front surface side of the cover panel 14, and the adhesive layer AD is thoroughly cured. The direction of the cover panel 14 with respect to the irradiator 122 varies from the first time when the adhesive layer AD is provisionally cured to the second time when the adhesive layer AD is thoroughly cured. Specifically, in the first irradiation, the back surface side of the cover panel 14 is opposed to the irradiator 122, and the adhesive layer AD is thereby directly opposed to the irradiator 122. In the second irradiation, the front surface side of the cover panel 14 is opposed to the irradiator 122, and the adhesive layer AD is thereby opposed to the irradiator 122 through the cover panel 14. In the second irradiation, the light-shielding layer RS exits between the adhesive layer AD and the irradiator 122. Light radiated from the irradiator 122 reaches the adhesive layer AD by passing through a display area where the light-shielding layer RS is not formed on the cover panel 14 or being diffracted at the periphery of the cover panel 14. The adhesive layer AD is thereby cured. In addition, as shown in FIG. 5B in an enlarged manner, a gap exists between the top edges 17s of the sidewalls 17b of the case 16 and the light-shielding-layer RS of the cover panel 14, and the adhesive layer AD is interposed therebetween. This gap also serves as an effective light path of light radiated from the irradiator 122.

The display panel 12 and the case 16 can be thereby firmly fixed to the cover panel 14 by the adhesive layer AD. Through the above-described steps, the LCD 10 is obtained.

According to the above-described method of manufacturing a liquid crystal display device, the adhesive layer AD (first area AR1) for fixing a liquid crystal display panel and the adhesive layer AD (second area AR2) for fixing a case can be formed simultaneously by applying pressure-sensitive adhesive to the cover panel 14 once. Thus, a reduction in the number of manufacturing steps and a reduction in the manufacturing cost can be attempted. Since the adhesive layer AD is provisionally cured after the adhesive layer AD is applied, the application can be performed, using liquid pressure-sensitive adhesive, and the facilitation of the application can be attempted. Since the liquid pressure-sensitive adhesive is applied, the periphery of the formed adhesive layer AD swells up because of surface tension. Thus, the adhesive layer which comprises the second area AR2 having a great layer thickness at its periphery can be easily formed.

As described above, according to the present embodiment, a display device wherein further reduction in thickness and further narrowing of a frame can be achieved, and a method of manufacturing the display device are obtained.

(First Modification)

Figure 15:
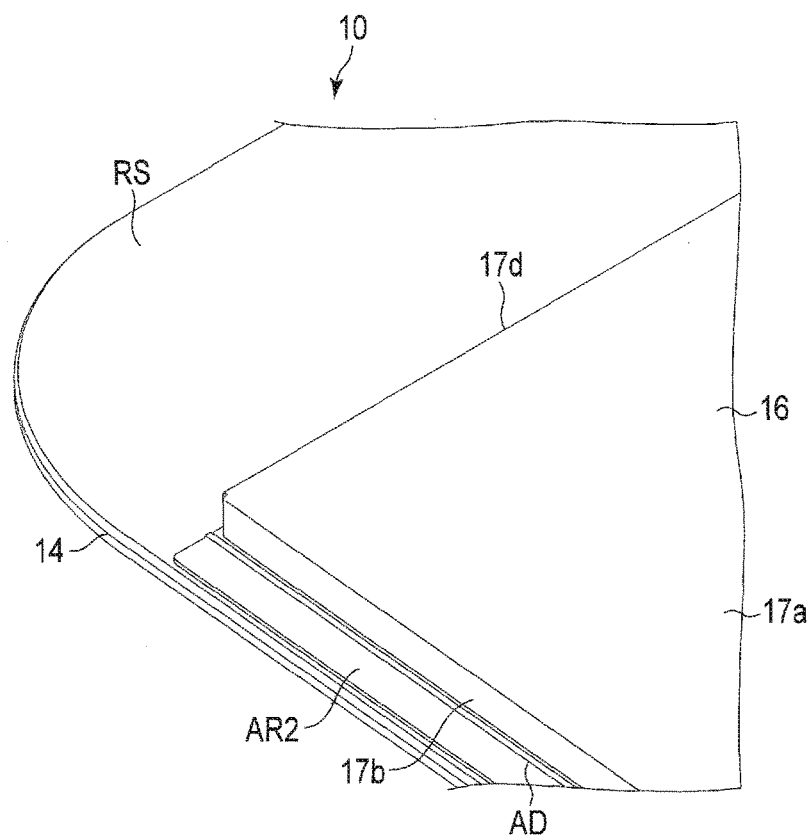
FIG. 15 is an enlarged perspective view showing a part of the liquid crystal display device according to a modification.

FIG. 15 is an enlarged perspective view showing a part of the liquid crystal display device according to a first modification. According to the modification, the second area AR2 of the adhesive layer AD is formed wide, and extends further than the sidewalls 17b of the case 16 to be in the vicinity of the side edges of the cover panel 14. In this case, the second area AR2 of the adhesive layer AD can also be used as adhesive (fixing member) for fixing the cover panel 14 to a housing of an apparatus. Thus, the further narrowing of the frame of the liquid crystal display device and a reduction in the manufacturing cost can be attempted.

Next, a liquid crystal display device according to another embodiment will be described. In the other embodiment described hereinafter, the same portions as those of the above-described first embodiment will be given the same reference numbers and a detailed description thereof will be omitted or simplified. Portions differing from those of the first embodiment will mainly described in detail.

(Second Embodiment)

FIG. 16 is a sectional view showing a part of a liquid crystal display device according to a second embodiment. FIG. 17 is a sectional view showing the state of a part of the liquid crystal display device before a second adhesive layer foams.

As shown in FIG. 16, according to the liquid crystal display device according to the present embodiment, sidewalls 17b of a case 16 are fixed to side surfaces of a display panel 12 by a second adhesive layer AD2. For example, except for a short sidewall on the light source unit side, a sidewall 17d on the other short side and the pair of sidewalls 17b on the long sides of the case 16 are attached to the side surfaces of the display panel 12, to which they are opposed to, respectively, with the second adhesive layer AD2. Accordingly, the case 16 is fixed to a cover panel 14 by a second area AR2 of an adhesive layer AD, and fixed to the display panel 12 by the second adhesive layer AD2.

As the second adhesive layer AD2, for example, foamable adhesive which foams and expands by being heated can be used. In the step of assembling the liquid crystal display device, as shown in FIG. 17, for example, a foamable adhesive sheet (second adhesive layer AD2) having a thickness of 50 pm is provisionally attached to the inner surfaces of the sidewalls 17b and 17d of the case 16. The foamable adhesive sheet is, for example, in the shape of a strip with a predetermined width and provisionally attached to positions adjacent to top edges 17S of the sidewalls 17b and 17d, that is, positions opposed to the side surfaces of the display panel 12. Then, the display panel 12 is covered with the case 16, and the top edges 17S of the sidewalls 17b and 17d are attached to the second area AR2 of the adhesive layer AD. In this state, as indicated by an arrow in FIG. 17, the foamable adhesive sheet is heated by a laser beam, a heater, or the like, from the outer surface side of the sidewalls 17b and 17d, and is foamed and expanded. The foamable adhesive sheet, for example, foams and expands to become 4.5 times thicker by being heated at 150° C. for approximately ten minutes. Thus, the foamable adhesive (second adhesive layer AD2) fills a gap between the sidewalls 17b and 17d and the side surfaces of the display panel 12, and the sidewalls 17b and 17d can be attached to the side surfaces of the display panel 12. At the same time, the second adhesive layer AD2 has a light-shielding function with being colored in black and the like. The second adhesive layer AD 2 covers the side surfaces of the display panel 12, and prevents light leakage from the side surfaces of the display panel 12. The other structures of the liquid crystal display device are the same as those of the liquid crystal display device according to the above-described first embodiment.

According to the liquid crystal display device having the above-described structure, the case 16 can be more firmly fixed while a narrow frame is maintained. In addition, a path of light can be completely closed by the case 16 and the second adhesive layer AD2. Light leakage from the side surfaces of the liquid crystal display panel is resolved, and it is unnecessary to shield light on the apparatus side of a display device, which is incorporated into the apparatus. Thus, according to the second embodiment, a liquid crystal display device which leaks no light and has a narrow frame can be achieved at low prices.

As the second adhesive layer AD2, not only the above-described foamable adhesive, but also epoxy adhesive, thermosetting adhesive, etc., can be used.

(Second Modification)

Figure 18:
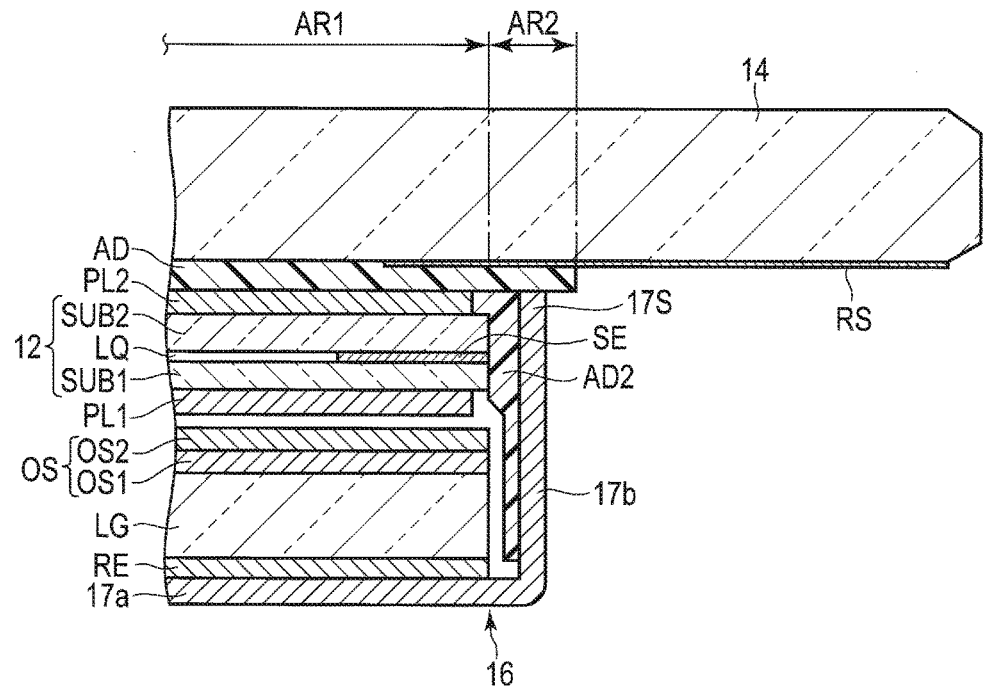
FIG. 18 is a sectional view showing a part of the liquid crystal display device according to a second modification.
Figure 19:
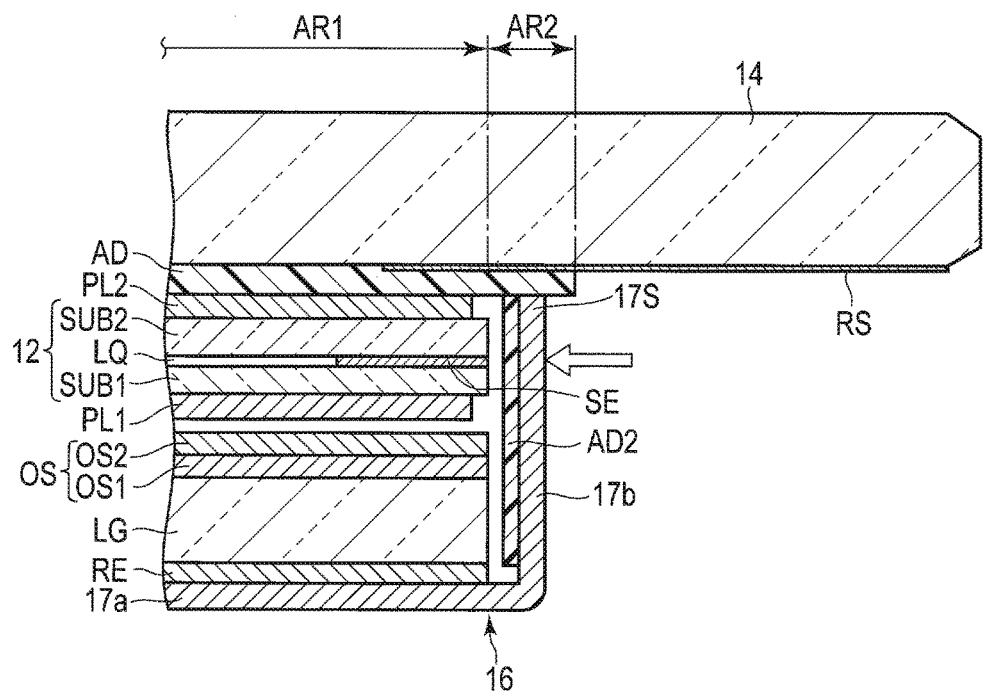
FIG. 19 is a sectional view showing the state of a part of the liquid crystal display device before the second adhesive layer foams in the second modification.

FIG. 18 is a sectional view showing a part of the liquid crystal display device according to a second modification. FIG. 19 is a sectional view showing the state of a part of the liquid crystal display device before the second adhesive layer foams.

If it is hard to provide the second adhesive layer AD2 only on the tops of the inner surfaces of the sidewalls 17a and 17d because the display panel 12 and a backlight unit 20 become thinner, the second adhesive layer AD2 may be provided over the whole surfaces in the height direction of the sidewalls 17b and 17d as shown in FIG. 18 and FIG. 19. In the step of assembling the liquid crystal display device, as shown in FIG. 19, for example, a foamable adhesive sheet (second adhesive layer AD2) in the shape of a strip having a thickness of 50 μm and a width substantially equal to the height of the sidewalls 17b and 17d is provisionally attached to the whole inner surfaces of the sidewalls 17b and 17d of the case 16. Then, the display panel 12 is covered with the case 16, and the top edges 17S of the sidewalls 17b and 17d are attached to the second area AR2 of the adhesive layer AD. In this state, as indicated by an arrow in FIG. 19, the foamable adhesive sheet is heated by a laser beam, a heater, or the like, from the outer surface side of the sidewalls 17b and 17d, and is foamed and expanded. At this time, an area opposed to the side surfaces of the display panel 12 of the foamable adhesive sheet is mainly heated and foamed. Thus, as shown in FIG. 18, the foamable adhesive (second adhesive layer AD2) fills a gap between the sidewalls 17b and 17d and the side surfaces of the display panel 12, and the sidewalls 17b and 17d can be attached to the side surfaces of the display panel 12. At the same time, the second adhesive layer AD2 has a light-shielding function, and can prevent light leakage from the side surfaces of the display panel 12 by covering the side surfaces of the display panel 12. An area opposed to the backlight 20 of the foamable adhesive sheet may be kept not foamed without being heated, and be opposed to the backlight unit 20 with a gap therebetween.

In the second modification, the other structures of the liquid crystal display device are the same as those of the liquid crystal display device according to the above-described first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

All of the structures and manufacturing processes that can be implemented by a person with ordinary skill in the art through arbitrary design changes based on the structures and manufacturing processes described above as the embodiments of the present invention are included in the scope of the present invention as long as they encompass the spirit of the present invention. For example, the thickness of the second area AR2 of the adhesive layer AD depends on the viscosity, the curing rate, etc., of the adhesive layer AD. In light of this point, the structure in which the second area AR2 has the same or substantially the same thickness as the first area AR1 can also be adopted.

Moreover, the structure in which the case 16 is used as a housing of an electronic apparatus such as a smartphone or a tablet computer can also be adopted.

Furthermore, other advantages that can be obtained by the above-described embodiments and are obvious from the description of this specification or can be conceived by a person with ordinary skill in the art as appropriate are naturally acknowledged as advantages of the present invention.

The number of optical sheets OS of the backlight unit 20 is not limited to two, and may be increased or reduced as necessary. The shapes of the liquid crystal display panel 12, the components of the backlight unit 20, and the case 16 are not limited to rectangles in a planar view, but may be other shapes such as a polygon in a planar view, a circle, an ellipse, and a combination thereof. Materials used for the components are not limited to the above-described examples and may be selected from various options. As pressure-sensitive adhesive or adhesive, not only super view resin but other photo-curing pressure-sensitive adhesive or adhesive which has great transparency can be selected.

What is claimed is:

1. A display device comprising:
   a cover panel;
   a display panel opposed to the cover panel;
   a polarizer provided between the cover panel and the display panel and fixed to the display panel;
   an adhesive layer provided between the cover panel and the polarizer, the adhesive layer attaching the display panel to the cover panel via the polarizer, the adhesive layer comprising a first area to which the display panel is fixed and a second area located further outward than the display panel;

a backlight unit opposed to the display panel; and a case containing the display panel and the backlight unit, at least a part of the case being fixed to the cover panel by the second area of the adhesive layer.

2. The display device of claim 1, wherein a thickness of the second area is greater than a thickness of the first area.

3. The display device of claim 2, wherein the case comprises a bottom wall opposed to the backlight unit and sidewalls provided along a peripheral edge of the bottom wall, a top edge of at least a part of the sidewalls is inserted in the second area of the adhesive layer, and the adhesive layer exists between the top edge and the cover panel.

4. The display device of claim 3, wherein a surface of the top edge is rougher than a surface of another part of the case.

5. The display device of claim 1, wherein the case comprises a bottom wall opposed to the backlight unit, and a pair of long-side sidewalls and a pair of short-side sidewalls provided along a peripheral edge of the bottom wall, and top edges of the long-side sidewalls are fixed in the second area of the adhesive layer.

6. The display device of claim 5, wherein the case comprises a flange portion provided on at least one of the short-side sidewalls, and the flange portion is fixed to the cover panel by an adhesive layer.

7. The display device of claim 1, wherein the adhesive layer is formed of photo-curing super view resin.

8. The display device of claim 1, further comprising a second adhesive layer by which the case is fixed to the display panel, the second adhesive layer being disposed between a side surface of the display panel and the case.

9. The display device of claim 8, wherein the second adhesive layer is formed of foamable adhesive configured to foam and expand by being heated.

10. The display device of claim 8, wherein the second adhesive layer covers the side surface of the display panel.

11. The display device of claim 1, wherein the cover panel includes a peripheral area that is located further outward than the display panel in plan view, and the cover panel covers the display panel and the case.

12. A method of manufacturing a display device, comprising:

forming an adhesive layer comprising a first area and a second area on a cover panel;

irradiating the adhesive layer with an ultraviolet ray and provisionally curing the adhesive layer;

attaching a display panel to the first area of the provisionally cured adhesive layer;

opposing a backlight unit to the display panel;

covering the backlight unit with a case, and attaching at least a part of the case to the second area of the provisionally cured adhesive layer; and irradiating the adhesive layer with an ultraviolet ray through the cover panel and thoroughly curing the adhesive layer.

13. The method of claim 12, wherein the forming the adhesive layer comprises applying liquid adhesive to the cover panel, swelling a peripheral portion of the adhesive layer by surface tension to form the second area, and irradiating the adhesive layer with the ultraviolet ray and provisionally cured, after the second area is formed.

* * * * *